(12) United States Patent
King et al.

(10) Patent No.: US 12,743,429 B2
(45) Date of Patent: Sep. 22, 2026

(54) DATA PIPELINE FOR 5G WIRELESS NETWORK

(71) Applicant: Boost SubscriberCo L.L.C., Englewood, CO (US)

(72) Inventors: Ian King, Englewood, CO (US); Brian Peletz, Englewood, CO (US); Steven Wilson, Englewood, CO (US); Prakash Srinivasan, Englewood, CO (US); Kevin Plunkett, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/311,860

(22) Filed: May 3, 2023

(65) Prior Publication Data

US 2023/0359632 A1 Nov. 9, 2023

Related U.S. Application Data

(60) Provisional application No. 63/338,269, filed on May 4, 2022.

(51) Int. Cl.

| | |
|---|---|
| ***G06F 16/24*** | (2019.01) |
| ***G06F 16/2453*** | (2019.01) |
| ***G06F 16/2455*** | (2019.01) |
| ***H04W 24/02*** | (2009.01) |

(52) U.S. Cl.

CPC .... *G06F 16/24568* (2019.01); *G06F 16/2454* (2019.01); *G06F 16/24542* (2019.01); *H04W 24/02* (2013.01)

(58) Field of Classification Search

None

See application file for complete search history.

(56) References Cited

U.S. PATENT DOCUMENTS

| | | | | |
|---|---|---|---|---|
| 6,829,491 | B1 * | 12/2004 | Yea | H04W 24/02 455/446 |
| 10,459,987 | B2 * | 10/2019 | Palko | G06Q 10/06 |
| 2007/0081469 | A1 * | 4/2007 | Tracy | H04W 24/02 370/252 |
| 2008/0049630 | A1 * | 2/2008 | Kozisek | H04L 43/0894 370/250 |
| 2015/0161214 | A1 * | 6/2015 | Kali | G06F 16/24558 707/758 |
| 2017/0338908 | A1 * | 11/2017 | Chebib | H04L 1/1812 |
| 2018/0089324 | A1 * | 3/2018 | Pal | G06F 9/546 |
| 2020/0210434 | A1 * | 7/2020 | Hillel | G06F 16/2255 |
| 2021/0168035 | A1 * | 6/2021 | Cui | H04L 41/0866 |

(Continued)

*Primary Examiner* — Kavita Stanley
*Assistant Examiner* — Cao D Vuong
(74) *Attorney, Agent, or Firm* — KW Law, LLP

(57) ABSTRACT

A data pipeline architecture provides for efficient and scalable data collection within a 5G wireless network. The data pipeline includes a data collection engine that receives streaming and/or query-based data. The data collection engine collects the data, amalgamates the streaming and the querly-based data into a common format, and provides the amalgamated data for delivery to a data reporting engine. The data reporting engine provides dashboards, reports, alerts or other information about the collected data. The data reporting engine may also interface with a database system for longer-term storage of collected data, report generation and/or the like.

19 Claims, 3 Drawing Sheets

(56) References Cited

U.S. PATENT DOCUMENTS

2021/0303585 A1* 9/2021 Fan ......................... G06F 16/27
2022/0358123 A1* 11/2022 Kancharla ........... G06F 16/2456
2023/0081673 A1* 3/2023 Junkins ................. H04W 24/08
370/235

* cited by examiner

DATA PIPELINE FOR 5G WIRELESS NETWORK

PRIORITY CLAIM

This application claims priority to U.S Provisional Application Ser. No. 63/338,269 filed on May 4, 2022, which is incorporated herein by reference.

TECHNICAL FIELD

The following generally relates to wireless data networks, such as 5G wireless networks. More particularly, the following relates to systems, devices and automated processes to monitor and/or control the performance of a wireless data network.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers and other devices. 5G technologies are capable of supplying much greater bandwidth than was previously available, so it is likely that the widespread deployment of 5G networks could radically expand the number of services available to customers.

Traditionally, data and telephone networks relied upon proprietary designs based upon very specialized hardware and dedicated point-to-point data connections. More recently, industry standards such as the Open Radio Access Network ("Open RAN" or "O-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT). Generally speaking, it is still necessary to implement the RUs with physical transmitters, antennas and other hardware located onsite within broadcast range of the end user's device.

Other components of the network, however, can be implemented using a more centralized architecture based upon cloud-based computing resources, such as those available from Amazon Web Services (AWS) or the like. This provides much better network management, scalability, reliability and redundancy, as well as other benefits. O-RAN CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual computers operating in parallel within the cloud environment. The many virtual servers can be very rapidly scaled to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed and/or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network capacity allows. The virtual components provide substantial efficiencies, especially when compared to prior networks that were based upon complex interconnections between geographically dispersed routers, servers and the like.

One technical challenge that arises in the new networks, however, involves monitoring the status and performance of rapidly-evolving dynamic networks. Network components can be commissioned and de-commissioned very rapidly, and conditions can evolve very quickly in various parts of the network. Tracking the performance and status of a large-scale RAN network can therefore be very difficult due to the scale of processing resources involved and the dynamic nature of such networks.

As new networks are developed and deployed, then, substantial challenges arise in tracking the performance of the network and its many distributed components. A substantial desire therefore exists to build systems, devices and automated processes that allow for monitoring and control of emerging 5G wireless networks. These and other features are described in increasing detail below.

BRIEF SUMMARY

According to various embodiments, a data pipeline architecture provides for efficient and scalable data collection and processing within a 5G wireless network. The data pipeline includes one or more data collection systems that provide streaming and/or query-based data from multiple processing modules to a data collection engine. The data collection engine collects the data and formats it for delivery to a data reporting engine. The data reporting engine provides dashboards, reports or other information about the collected data. The data reporting engine may also interface with a database system for longer-term storage of collected data.

One example embodiment provides a 5G wireless network system. The wireless network system suitably comprises: a plurality of processing modules that collectively implement the various components of the 5G wireless network, wherein each of the processing modules produces operating data during operation, and wherein the plurality of processing modules comprising a first data source configured to provide a data stream comprising first operating data about the first data source and a second data source configured to provide responses to queries, the responses comprising second operating data about the second data source; a data collection system configured to receive both the first data stream comprising the first operating data from the first data source and the responses to the queries comprising the second operating data from the second data source, and to amalgamate the first and second operating data into a common data format; and a data management system configured to receive the amalgamated first and second operating data in the common data format, to store the amalgamated operating data in a database, and to provide an output that describes the amalgamated operating data.

Other embodiments provide a data management system comprising a processor and a data storage comprising computer-executable instructions that, when executed by the processor, perform an automated process. The automated process suitably comprises: for each of a plurality of first data sources described in a source list, maintaining a subscription to a data feed provided by the first data source to receive first operating data related to the first data source; for each of a plurality of second data sources described in the source list, placing queries to the second data source and responsively receiving second operating data related to the second data source; filtering the first operating data received from the first data sources and the second operating data received from the second data sources; and providing the first operating data received from the first data sources and the second operating data received from the second data sources for storage in a shared database.

Still other embodiments provide an automated process performed by a data processing system associated with a 5G or other wireless network. The data processing system comprises a processor and a memory. The automated process suitably comprises: for each of a plurality of first data sources described in a source list, maintaining a subscription to a data feed provided by the first data source to receive first operating data related to the first data source; for each of a plurality of second data sources described in the source list, placing queries to the second data source and responsively receiving second operating data related to the second data source; filtering the first operating data received from the first data sources and the second operating data received from the second data sources to thereby format the first and second operating data into a shared format; and providing amalgamated data comprising at least some of the first operating data received from the first data sources and at least some of the second operating data received from the second data sources in the shared format for storage in a common database.

These and other example embodiments are described in increasing detail below.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a centralized data collection system obtains operating or other performance data relating to the various modules of a RAN-based mobile network system. The centralized data collection system can be configured to receive streaming data that may be available from one or more data sources. Alternately and/or additionally, the centralized data collection system can place queries to other sources of data. Data received via query and/or streams can be filtered, formatted, tagged with metadata and/or otherwise processed into a common format for delivery a data management system that stores the collected data for later processing. The data management system may additionally (and/or alternately) create dashboard or other reports for evaluation by humans and/or by other automated processes based upon the amalgamated streaming and query-based data that has been placed in a common format.

Using a "data pipeline" in this sense allows for real time (or near real-time, accounting for some delays inherent in processing, data communications and the like) monitoring and control of a 5G wireless network in a manner that was not previously thought to be possible. The use of a centralized data collection system also provides for rapid adaptation to dynamic cloud-based systems in a manner that makes very efficient use of available data processing resources, thereby conserving energy, data storage and cost to the system operator.

Figure 1:
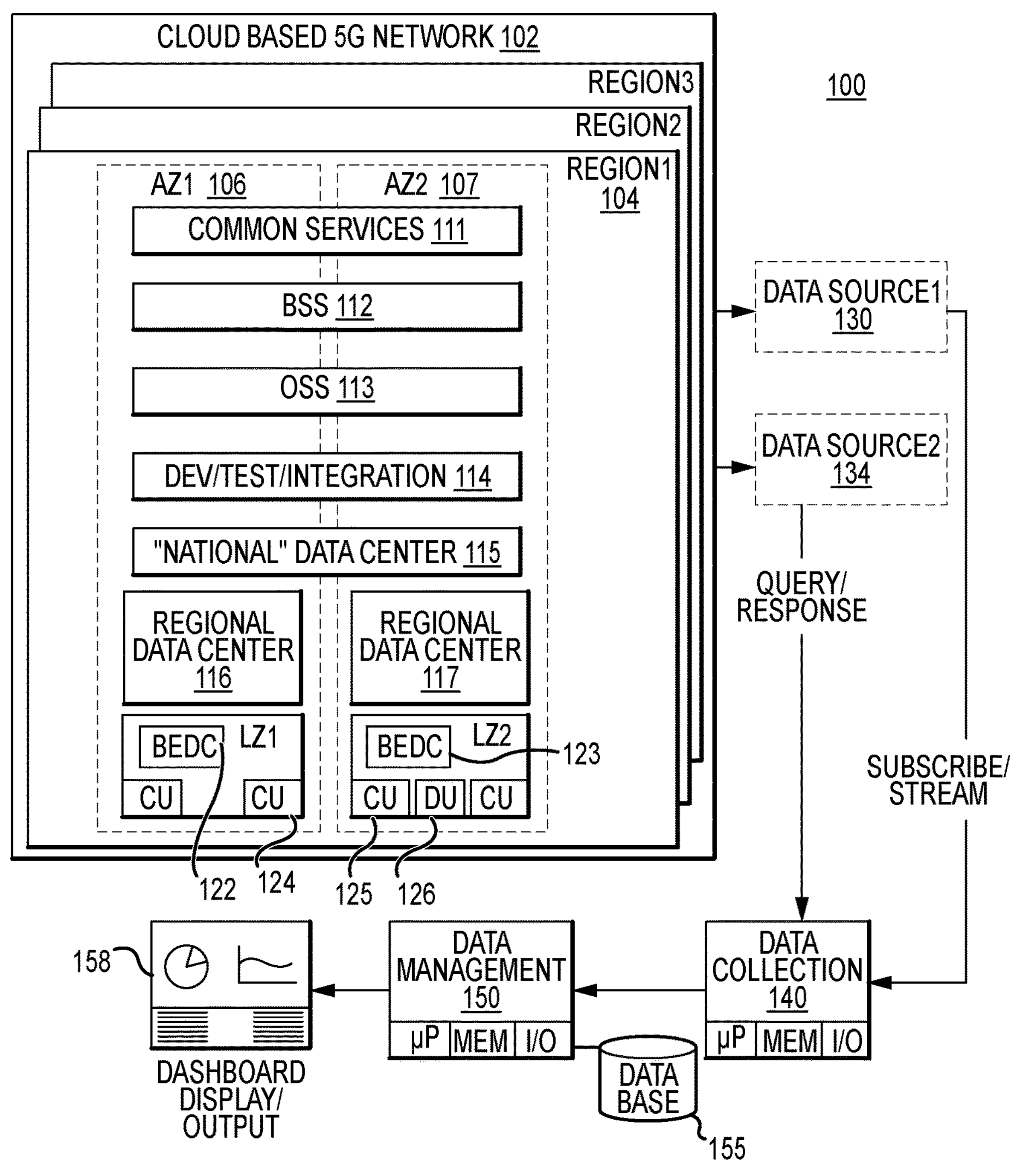
FIG. 1 shows an example of a wireless network having integrated data monitoring capabilities.

With reference to FIG. 1, a 5G wireless network 102 can be implemented using cloud-based computing resources, such as those available from Amazon Web Services Inc. (AWS) of Seattle, Washington. Other cloud services are available from Microsoft Corp. of Redmond, Washington, IBM Corp. of Armonk, New York, and others. In the example of FIG. 1, network 102 encompasses data processing services supporting multiple regions 104, each having one or more availability zones (AZs) 106, 107 each acting as a separate data center with its own redundant power, network connectivity and other resources as desired. In some implementations, the various AZs operating within the same region will provide redundancy in the event that another AZ would fail, become overloaded, or otherwise become unavailable. The example of FIG. 1 illustrates three regions, with region 104 having two AZs 106, 107, although other embodiments could include any number of regions and AZs providing any number of services and resources. The regions and zones are often described herein with reference to geographic locations, but in practice the regions and zones could be equivalently organized based upon customer density, user density, expected network demand, availability of electric power and/or bandwidth, and/or any other factors. As noted above, it will still be necessary to deploy radio units (RUs) within broadcast range of end users. But by implementing the other functions of the network using virtualized hardware operating within a cloud-type architecture, geographic restrictions upon the network 102 can be greatly reduced. This can provide substantial efficiencies in deployment and expansion of network 102, while also allowing for more efficient use of computing resources, data storage and electric power.

In example system 100, a network operator maintains ownership of one or more radio units (RUs) 128, 129 associated with a wireless network cell. Each RU 128, 129 suitably communicates with user equipment (UE) operating within a geographic area using one or more antennas/towers capable of transmitting and receiving messages within an assigned spectrum of electromagnetic bandwidth. In various embodiments, the assigned spectrum may be allocated across one or more guest networks 1 to support multiple concurrent networks, if desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein.

In the example illustrated in FIG. 1, common services (e.g., billing, guest network allocation, etc.) can be performed in a shared service 111 across the available AZs 106, 107. Typically, these shared services will be implemented within a common virtual private cloud (VPC) operating within the cloud environment. Similarly, shared VPC systems can support business support system (BSS) 112, operational support services (OSS) 113, development/test/integration features 114, and/or the like across the entire region. A region wide data center (identified as a "national" data center 115 in FIG. 1) could be implemented in a shared VPC across AZs 106, 107, if desired, with subordinate data centers (e.g., "regional" data centers 116, 117) being separated into different VPCs for each of the AZs 106, 107. Additional levels of data centers could be provided, if desired, and/or the different data center functions could be differently organized in any number of equivalent embodiments. The various data centers could provide any number of services such as IP multimedia services (IMS), 5G core services and/or the like.

In the example of FIG. 1, each AZ 106, 107 includes one or more breakout edge data centers (BEDCs) each supporting a local zone (LZ) with one or more RUs. The BEDCs are ideally organized for very low latency to provide best possible throughput and low latency to the various user equipment operating within the local zone. BEDCs 120, 121 will typically implement one or more CUs in accordance with the O-RAN specifications. BEDCs may also implement user plane functions that handle user data sessions for gaming, streaming and other network services, as desired. Again, any number of BEDCs and other data centers may be implemented using any number of different or shared VPCs in the cloud environment, as desired.

As noted above, each of the various network components shown in FIG. 1 are typically implemented using software or firmware instructions that are stored in a non-transitory data storage (e.g., a disk drive or solid state memory) for execution by one or more processors within the VPC. VPCs may provide any number of additional features to support the data handling functions of the system, including redundancy, scalability, backup, key management and/or the like.

Each RU 128, 129 is typically associated with a different wireless cell that provides wireless data communications to any number of user devices operating within broadcast range of the cell. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid state memory) and appropriate interfaces to perform the various functions described herein. RUs are physically located on-site with the transmitter/antenna, as appropriate. Conventional 5G networks may make use of any number of wireless cells spread across any geographic area, each with its own on-site RU.

User devices are often mobile phones or other portable devices that can move between different cells associated with the different RUs, although 5G networks are also widely expected to support home and office computing, industrial computing, robotics, Internet-of-Things (IoT) and many other devices. While the example illustrated in FIG. 1 shows just a few RUs 128, 129 for convenience, a practical implementation will typically have any number of RUs that can each be individually configured to provide highly configurable geographic coverage for the 5G network 102.

As noted above, the various components of network 102 can be implemented using virtual private clouds (VPC) or other virtual hardware components. Each of these VPCs will typically produce data during operation that indicates status, performance, capacity and/or any number of other parameters. It is generally desired to monitor the status of network 102. One way to track network status is to process the large amount of data produced by the various modules and components to generate dashboards and/or other reports that can be viewed by an operator. Operating data can also be used to adjust the configuration or operation of the network, as desired. By tracking data produced by the various components of network 102, then, the performance of the network can be monitored and adjusted as desired.

In various embodiments, one or more data sources 130, 134 are provided to obtain raw data from one or more of the components of network 102. Data sources 130, 134 may be receive data as part of a data stream, if desired. Other data sources 130, 134 may simply receive and maintain log data or the like from one or more associated components, as appropriate. Any number of streaming and/or query-based data sources 130, 134 may be deployed within system 100 as desired, and streaming data sources may be intermixed and/or combined with query-based data sources in any manner.

In the example shown in FIG. 1, data source 130 may be configured as a streaming data source in accordance with the KAFKA software tool available from the Apache Software Foundation. The software may be installed to execute on any sort of hardware, including a conventional computer server with a processor, memory and input/output interfaces to the appropriate components of network 102. Equivalently, data source 130 may be implemented using a virtual private cloud or virtual server system as part of a cloud provider, as desired.

The streaming data source 130 will typically be configured to receive real-time data (or near real time data, accounting for some delays inherent in data processing, communications and the like) from one or more components of network system 102. Streaming data may be particularly useful for network components that generate substantial amounts of real-time data (e.g., performance measurements, etc.). Data source 130 will be configured to receive the data stream from the monitored component of system 102, typically as a consumer process executed by the data source 130. Other embodiments may use other tools, and/or may be configured in any other manner.

If desired, multiple components of 5G wireless system 102 could supply KAFKA or other streaming data to a common data source 130. DU and CU modules of network 102, in particular, provide substantial amounts of real-time data that can be very efficiently pipelined through a combined streaming source 130, as appropriate.

In the example of FIG. 1, data source 134 is shown as a query-based source that collects data from one or more components of network 102. Generally speaking, data handled by query-based sources tend to be less reliant upon real-time delivery for status updates or the like. Log data, fault metrics, performance metrics and other types of time-series data may be particularly well-suited for query-type collection.

In one embodiment, query-based data source 134 is implemented using PROMETHEUS software or the like, which allows for a pull-based data collection model using HTTP-type messaging. In this example, the PROMETHEUS software is configured to run on a computer server (implemented with conventional hardware and/or cloud-based resources as desired) that queries the monitored components according to any desired time schedule to receive data. The data received in response to the queries may be locally cached in any sort of non-transitory memory (e.g., solid state memory, magnetic or optical memory, cloud-based sources, and/or the like) for subsequent retrieval and processing as desired. Query-based data sources may be particularly useful in tracking data produced by the various DUs, MTAs and other components of the network that produce substantial amounts of log data. Typically, each monitored component is internally configured to write its output/log data to the data source 134, as desired.

Although FIG. 1 illustrates one streaming data source 130 and one query-based data source 134, in practice any number of different sources could be used to monitor any number of different components of network 102. Some components may provide streaming data and query based data to multiple data sources, if desired.

A data collection system 140 suitably communicates with one or more data sources 130, 134 to obtain streaming and/or query-based data. In various embodiments, data collection system 140 subscribes to one or more KAFKA feeds or other streaming services associated with data sources 130. Data collection system 140 may also be configured to place queries to PROMETHEUS or other query-based data sources 134 as desired. Data collection system 134140 typically receives the requested and/or subscribed data, formats and/or filters the received data as appropriate, and forwards the collected data to a data management system 150 for storage, reporting and/or any other further processing as desired. In various embodiments, the data collection system 140 receives data in JSON or similar format, appends source and/or service location information as tags or the like, and pushes the tagged data to the data management system 150 (using, e.g., HTTP structures or the like). Generally, the data collection system will be configurable to specify batch sizes, delivery times and/or other parameters for obtaining query based data and/or for pushing collected data to the data management system 150. Some embodiments may also filter the received data as desired to remove unwanted or unnecessary data that would otherwise consume excess storage in data management system 150. Other embodiments may perform additional monitoring, as needed.

Data management system 150 is any data processing system capable of receiving the data from data collection system 140 and formatting or otherwise presenting the collected data for further use. In various embodiments, data management system 150 is a computer server implemented with conventional or virtual cloud-based hardware executing DATADOG or similar software for managing collected data. In various embodiments, data management system 150 stores received data in a database 155 for later retrieval, as desired. Data management system 150 may also provide reports to human and/or automated reviewers. One or more dashboards may be presented on any display 158, for example. Reports can be used to monitor the status of network 102, to adapt the configuration or operation of network 102 (or any component thereof), and/or for any other purpose. Data management system 150 may further provide real-time alerts (e.g., via email, text message or the like) to human operators if certain events occur, such as outages, shutdowns, security breaches and/or the like.

The example illustrated in FIG. 1 shows data sources 130, 134 as obtaining aggregated data from components of network 102. This points out the relationships between the sources of data, data collection system 140 and data management system 150. In a practical implementation, however, data collection system 140 may be equivalently configured to subscribe to live data streams and/or to posit queries directly to the components of network 102, without the need for separate data aggregation systems 130, 134 as desired. In another equivalent embodiment, the functionality of data sources 130, 134 is designed into the components of the network 102 themselves, thereby obviating the need for separate aggregation. One or more components of network 102 may be configured to supply a KAFKA or similar data stream directly to data collection system 140, for example. Similarly data collection system 140 could posit queries directly to components of system 102, if desired, without the need for intervening processing modules. Other embodiments could implement the various functions and components described herein in any number of equivalent arrangements.

Figure 2:
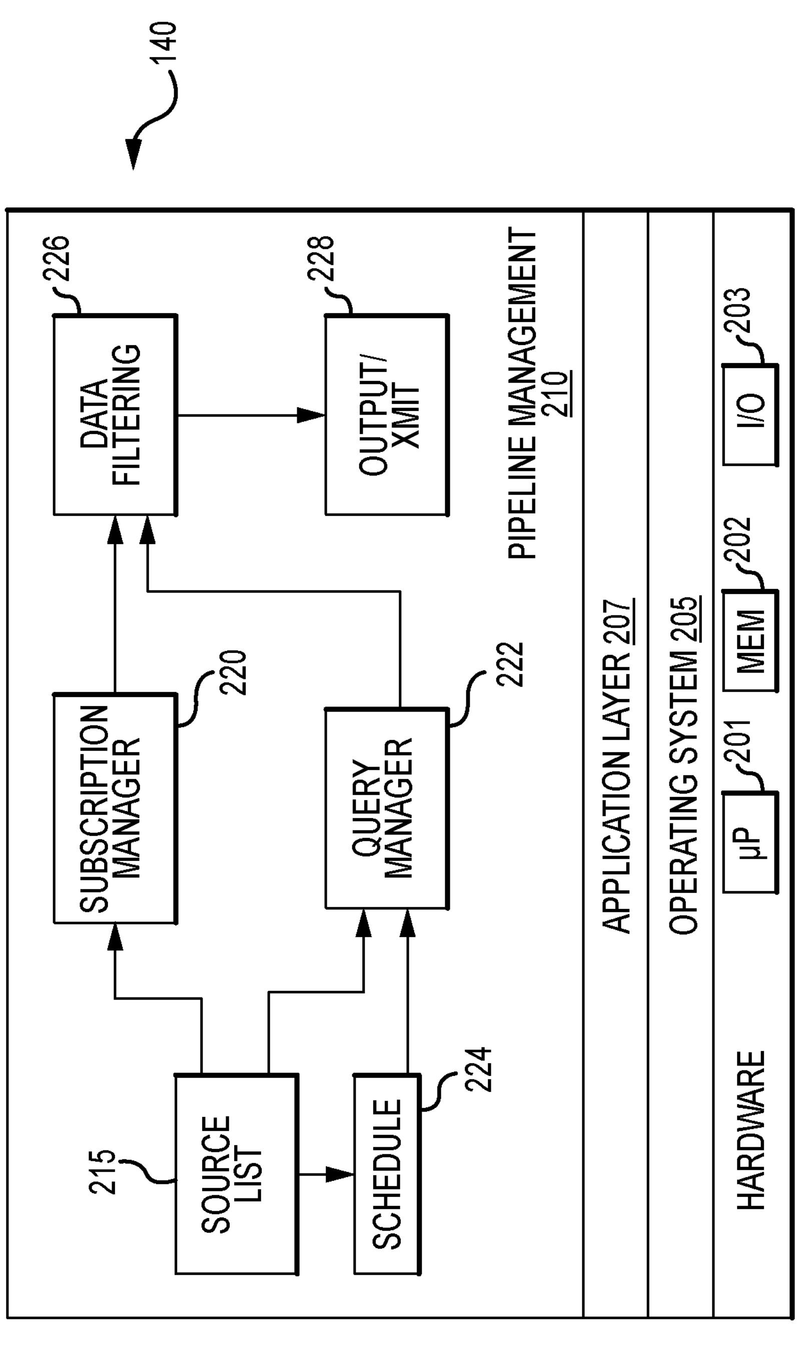
FIG. 2 is a block diagram illustrating one example of a data collection system for a wireless network.

Turning now to FIG. 2, an example data collection system 140 suitably manages streaming and/or query-based data collection in any manner. As illustrated in FIG. 2, data collection system 140 may be implemented using any sort of computing hardware, such as any sort of processor 201, memory or other non-transitory data storage 202 and input/output interfaces 203 for data communications and/or the like. In various embodiments, hardware 201-203 is abstracted by virtual computing resources available from AWS or another cloud computing platform. Data collection system 140 could be implemented within a lambda function, for example, or within its own VPC, if desired. The computing hardware typically operates under the control of an operating system 205 (e.g., any version of the LINUX operating system, or any other open or proprietary operating system, such as an operating system provided by a cloud service operator). Generally speaking, the server platform will provide an application layer 207 for creating and executing applications, such as the pipeline management application 210 illustrated in FIG. 2.

In the example of FIG. 2, a pipeline management application 210 suitably includes a source list 215; a subscription management feature 220 for maintaining subscriptions to KAFKA or other data streams; a query formatting feature 222 that creates queries that are placed according to a scheduler 224; a data filtering feature 226 and an output feature 228. Each of the various features and modules described in FIG. 2 may be implemented in software and/or firmware that resides in non-transitory data storage for execution by one or more processors to perform the various automated processes described herein. To that end, data collection system 240 can be implemented with one or more conventional processors 201 and non-transitory data storage 202 that maintains computer-executable instructions implementing program 210 for execution by processor 201. Again, the actual hardware may be abstracted through the use of cloud computing resources, as desired.

Data can be obtained from any number of streaming and/or query based sources. In various embodiments, a configurable source list 215 maintains a listing of data sources, along with any associated data about the sources or the collection of data from that source. In one example, each source is listed with an identifier, a URL or similar address where the source can be messaged, and indicia of whether the source is a streaming source and/or a query-based source. In various embodiments, additional information such as timing of queries or streaming parameters may also be provided. Source list 215 may be manually and/or automatically updated at any time so that the information remains current. Additional data sources can be added to reflect when new sources come online, for example; sources can be removed or modified as subsequent operation of network 102 demands. Management application 210 suitable uses the information in source list 215 to drive streaming subscriptions and/or query generation as appropriate. To that end, application 210 may check source list 215 according to any regular or irregular time interval, and/or as directed by external processes if desired. Although the example of FIG. 2 shows one source list 215, equivalent embodiments could be configured with separate lists 215 for streaming and query-based data, if desired, and/or multiple lists 215 could be maintained for separate processing clusters or the like if desired.

Data collection system 140 can subscribe to any number of data streams providing data in any format. In the embodiment of FIG. 2, a subscription manager 220 feature includes a list of subscribed data streams, along with URL or other addressing information about the subscribed stream. Stream delivery may occur according to any protocol or format, such as the KAFKA format or the like. To that end, subscription manager 220 may be implemented using a KAFKA consumer application that subscribes to the various KAFKA feeds within system 102, although equivalent embodiments could use other systems, structures or formats as desired. Streams may be received directly from components of network 102, and/or from any other streaming data sources 130 as desired.

Data can alternatively or additionally be received from other components of network 102 acting as query-based data sources 134. In the example of FIG. 2, a scheduling module 224 maintains a time schedule for placing queries to the various data sources that are being monitored. Scheduler 224 acts as a CRON or similar timing feature that triggers queries on any regular or irregular interval, at set times as desired, and/or in response to externally applied interrupts or other events. Queries may be formatted in accordance with PROMETHEUS, SQL, JSON and/or any other format that can be posited to the data sources 134 (and/or directly to components of system 102) as directed by scheduler 224, as appropriate. JSON data structures and interfaces may be used to request and receive query data, as appropriate, although other embodiments could use XML or any other format (including any proprietary format) desired. Data may be requested and received via a local area or wide area network, as appropriate, or locally within a cloud-based system, as desired.

As noted above, data received via data streams and/or in response to data queries can be filtered or otherwise processed as desired. Data filtering feature 222 suitably receives data in JSON or another appropriate format. The received data may be augmented with additional data (e.g., source identifier, timing information, region or AZ identification, or the like). Augmentation could be provided through JSON or XML tagging, if desired, or in any other manner. The data can also be filtered as desired to remove any unwanted components, if desired.

Processed data is provided to output feature 228 for delivery to the data management system 150 described above. In various embodiments, output feature 228 provides data to the data management system 150 using HTTP structures (e.g., HTTP "PUT" features) or the like.

In operation, then, data management system 140 suitably obtains streaming and/or query-based data from one or more components of a 5G wireless network operating within a cloud-based computing environment. The data is obtained directly from the component, and/or via intervening data source systems 130, 134 that aggregate data from multiple data sources within the network 102. Collected data is tagged and filtered as desired, and the resulting data is delivered to a data management system 150 for storage, reporting and/or other actions as appropriate. Other embodiments may include other processing modules in addition to those illustrated in FIG. 2, and/or may provide the various features and functions described herein using different (but equivalent) arrangements of processing modules and features, as desired.

Figure 3:
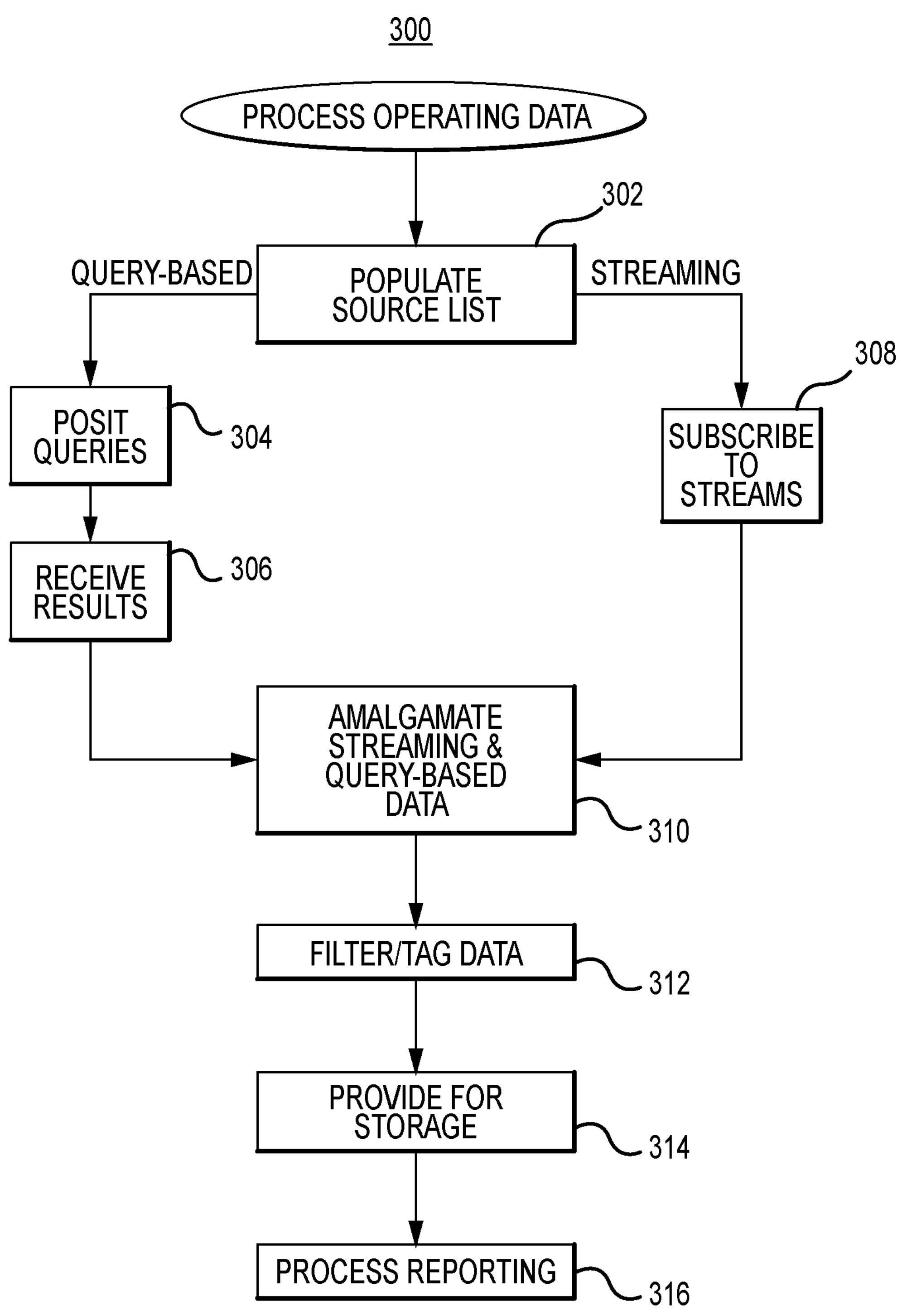
FIG. 3 is a flowchart illustrating one example of an automated process to automatically collect operating data for a wireless network.

FIG. 3 is a flowchart illustrating one example of an automated process 300 performed by a data collection system 140, a data management system 150 and/or other components of a wireless network system 100. The various functions shown in FIG. 3 may be distributed amongst the various components of system 100 in any manner, and different embodiments may organize the processing of various features in any number of different ways. In one example, data collection system 140 performs the data collection and filtering functions (e.g., functions 302-314), while data management system 150 performs the data storage and reporting functions (e.g., functions 314-316).

Process 300 suitably includes the broad functions of populating a list of data sources (function 202), obtaining operating data from each of the listed sources by positing queries (functions 304, 306) and/or subscribing to a data stream published by the data source (function 308). Operating data obtained from query and streaming sources can be amalgamated (function 310) for further processing, as desired. The amalgamated data can be filtered as desired, and/or tagged for further analysis (function 314). The processed data is provided for output (function 314), such as storage in a database 155 or the like. Dashboards, reports, alerts and/or other forms of reporting may be processed from the stored amalgamated data as desired (function 316). Equivalent embodiments may supplement or differently-organize the various functions shown in FIG. 3 in any way desired.

Source list 215 may be populated in any manner (function 302). In various embodiments, source list 215 may be manually updated by a human operator using a text editor, software application program interface (API), web-enabled form, or other mechanism for data entry. In other embodiments, source list 215 may populated by one or more control routines operating within system 102. As new modules are spawned within system 102, for example, the process that spawns the new module may be programmed to update source list 215 so that the newly-spawned module can be tracked. Again, the list may be updated using any appropriate interface, including internal communications within a cloud service provider or the like.

Source list 215 will typically maintain, for each data source, a listing of the source based upon an identifier or name, as desired. Additional information may also be maintained, such as dates or times that data collection is to be initiated or halted, dates and times of data collection, and/or the like. Source list 215 may also include a URL or other locator to obtain operating data from the source, and/or an indicator of whether the source provides streaming or query-based data. This indicator may be a simple binary flag, if desired, or a more complex representation as desired. Source list 215 may also contain parameters for data filtering (e.g., desired data frequency, desired reporting thresholds or limits, amounts of data to be maintained, and/or any other parameters as desired).

The source list 215 is processed in any manner to obtain operating data from the various sources. In the embodiment illustrated in FIG. 3, subscription-type data (function 308) is obtained in parallel with query-based data (functions 304, 306), as desired. For query based data, queries may be formatted as appropriate and transmitted to the relevant data source (function 304). Queries may be formatted using HTTP constructs (e.g., HTTP "GET" statements) that are transmitted to a URL associated with the data source, for example. Other embodiments could posit queries in accordance with a cloud messaging service for transmission within the cloud service, if desired, or in any other manner. Queries 304 will prompt the relevant data source to respond in kind (function 306) to supply the queried operating data as appropriate.

Streaming data is similarly obtained in any manner (function 308). In various embodiments, the source is programmed or otherwise configured to publish a data stream that can be received by a subscription manager 220 or similar data consumer application. The KAFKA streaming system provided by Apache Software Foundation is one example of a streaming platform that can be leveraged to distribute and receive streaming data, as desired, although other embodiments could be formulated with any number of equivalent products and services, as desired.

Streaming and query-based operating data received from the various data sources is amalgamated in any manner (function 310). In various embodiments, the received data is at least temporarily stored in a database or other storage available to data collection platform 140 for subsequent processing. Data can also be formatted, as desired, so that data received from different sources can be collectively processed and used in reporting functions described below. Amalgamating data from different types of sources permits much more sophisticated analysis and reporting than was previously available from disjoint data collection sources.

The amalgamated operating data collected from query-based and stream-based data sources can be filtered, tagged and/or otherwise processed for subsequent analysis (function 312). Generally speaking, many embodiments will place received data into a relatively consistent format that can be analyzed and processed by data management system 150 to permit dashboards, alerts and reports to be generated by a common system from different types of data that have been collected about system 102.

Filtering may involve removing certain received data from further processing, as desired. In some embodiments, filtering parameters are stored in source list 215 for one or more different sources. Other embodiments could additionally or alternatively apply "system level" parameters regarding data that should be kept and/or discarded. Data from one or more sources may be discarded for certain days or times, for example, or data that is "out of range" or otherwise exceeding a parameter limit could be ignored, if desired. That is, data that is unlikely to be of further interest for any reason could be discarded to prevent excessive storage overhead, to reduce confusion with more relevant data, and/or for any other purposes. Other filters could collect only certain types of data that are of particular interest, as desired.

Data tagging may be performed in any manner. In various embodiments, the operating data received from the various data sources is automatically tagged with metadata or other information about the data source, the method of collection, dates and/or times of collection, and/or any other information that may be desired. Tagging may be performed by associating the data values with other relevant information within an extensible markup language (XML) structure, a Javascript object notation (JSON) structure and/or any other format desired. In various embodiments, data collection system 140 automatically places both streaming and query-based data into a consistent format, along with any appropriate metadata. Placing both streaming and query-based data into a consistent structure (e.g., JSON) with appropriate metadata can permit more powerful monitoring and reporting, as described below.

Data collection system 140 provides the amalgamated data for output and storage in any manner (function 314). In various embodiments, the filtered and tagged data is transmitted to a data management system 150 for storage in a database 155 and subsequent analysis. In one example, data management system 150 implements a data monitoring service such as DATADOG cloud monitoring or the like. In some implementations, the data monitoring service receives JSON, XML or similarly formatted data from data collection system 140 via secure or unsecure HTTP or the like, although other protocols or formats could be equivalently applied.

Data stored in database 155 can be processed in any manner (function 316). In various embodiments, the stored data is processed (e.g., by the data monitoring service executed by data management system 150) to create reports, dashboards, alerts and/or the like. Reports may be generated in response to queries received via an API or the like, as desired. Dashboards may be generated for real time presentation to monitor current status of system 102 and/or its components. Alerts (e.g., text message or email alerts) could be generated based upon one or more data values passing a threshold (e.g., for high or low utilization, excessive loading, etc.), in response to detected outages or other important events occurring within system 102, and/or based upon any other factors. Any number of electronic outputs may be provided for display, publication and/or messaging, as desired.

Various embodiments therefore provide a data pipeline system that can monitor the operations of a 5G wireless network 102 and/or its various components, particularly components that operating within a cloud-based computing environment. In contrast to prior systems that were unable to process "big picture" analysis due to disparate types of data collection, a data pipeline as described herein is able to collect both query-based and streaming data, to amalgamate both types of data into a consistent format that can be tagged with relevant metadata, and to provide the amalgamated data for further analysis. Other embodiments may provide additional benefits and features, as desired.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A data processing system comprising one or more cloud-based processors, data storage and digital interfaces to implement a 5G wireless network, the cloud-based data processing system comprising:

a plurality of processing modules executed by the one or more cloud-based processors, wherein each of the plurality of processing modules implements a component of the 5G wireless network, wherein each of the processing modules produces operating data during operation of the component of the 5G wireless network, and wherein the plurality of processing modules comprises a first data source configured to provide a real time data stream comprising first operating data about a first component of the 5G wireless network and a second data source configured to provide responses to queries, the responses comprising second operating data about a second component of the 5G wireless network;

a computer-implemented data collection system configured to populate a configurable source list of components of the wireless network, wherein the source list comprises, for each of the components, an identifier of the component and an indication of whether the component provides a real time data stream or query-based data, wherein the computer-implemented data collection system is further configured to receive both the real time data stream comprising the first operating data about the first component of the 5G wireless network and the responses to the queries comprising the second operating data about the second component of the 5G wireless network, and to automatically amalgamate the first and second operating data by converting the first and second operating data into a common data format, and wherein the computer-implemented data collection system is further configured to dynamically update the configurable source list as the plurality of processing modules come online and offline; and a data management system configured to receive the amalgamated first and second operating data in the common data format, to store the amalgamated operating data in a database, to monitor the current status of the 5G wireless network based upon the amalgamated operating data in the common data format that comprises both the first operating data from the real time data stream provided by the first component and the second operating data provided by the second component in response to the queries, and to provide a real-time output that describes the amalgamated operating data representing both the first and second operating data received from the first and the second components of the 5G wireless network, respectively, wherein the real-time output identifies an important event occurring within the 5G wireless network.

2. The data processing system of claim 1 wherein the important event is a detected outage of the 5G wireless network.

3. The data processing system of claim 1 wherein the important event is an excessive load condition of the 5G wireless network.

4. The data processing system of claim 1 wherein the important event is a high utilization of at least one component of the 5G wireless network.

5. The data processing system of claim 1 wherein the important event is a low utilization of at least one component of the 5G wireless network.

6. The data processing system of claim 1 wherein the first data source, the second data source, the data collection system and the data management system are each implemented in computer-executable instructions stored in a non-transitory data storage and executed by the one or more cloud-based processors.

7. A data management system for a wireless network, the data management system comprising a processor and a data storage, the data storage comprising computer-executable instructions that, when executed by the processor, perform an automated process comprising:

populating a configurable source list of components of the wireless network, wherein the source list comprises, for each of the components, an identifier of the component and an indication of whether the component provides a real time data feed or query-based data;

for each of a plurality of first components of the wireless network described in the configurable source list that provide the real time data feed, maintaining a subscription to the real time data feed provided by the first component of the wireless network at an address specified in the configurable source list to receive first operating data related to the first components of the wireless network;

for each of a plurality of second components of the wireless network described in the configurable source list that provide the query-based data, placing queries to the second component of the wireless network according to a schedule defined in the configurable source list, and responsively receiving second operating data related to the second component of the wireless network;

filtering the first operating data received from the first components of the wireless network and the second operating data received from the second components of the wireless network to thereby convert the first and second operating data into a shared format;

providing amalgamated data in the shared format for storage in a common database, the amalgamated data comprising at least some of the first operating data received from the first components of the wireless network and at least some of the second operating data received from the second components of the wireless network in the shared format;

monitoring a status of the wireless network based upon the amalgamated data in real-time and generating a real-time alert in response to one or more values of the amalgamated data passing a threshold, wherein the real-time alert corresponds to an important event occurring in the wireless network; and automatically updating the source list as instances of the first and second components of the wireless network come online and offline during operation of the wireless network.

8. The data management system of claim 7 wherein the important event corresponds to a detected outage.

9. The data management system of claim 7 wherein the important event corresponds to an excessive loading condition.

10. The data management system of claim 7 wherein the important event corresponds to a high utilization of one or more components of the wireless network.

11. An automated process performed by a data processing system associated with a wireless network, the data processing system comprising a processor and a memory, the automated process comprising:

populating a configurable source list of components of the wireless network, wherein the source list comprises, for each of the components, an identifier of the component and an indication of whether the component provides a real time data feed or query-based data;

for each of a plurality of first components of the wireless network described in the configurable source list that provide the real time data feed, maintaining a subscription to the real time data feed provided by the first component of the wireless network at an address specified in the configurable source list to receive first operating data related to the first components of the wireless network;

for each of a plurality of second components of the wireless network described in the source list that provide the query-based data, placing queries to the second component of the wireless network according to a schedule defined in the configurable source list, and responsively receiving second operating data related to the second component of the wireless network;

filtering the first operating data received from the first components of the wireless network and the second operating data received from the second components of the wireless network to thereby convert the first and second operating data into a shared format;

providing amalgamated data in the shared format for storage in a common database, the amalgamated data comprising at least some of the first operating data received from the first components of the wireless network and at least some of the second operating data received from the second components of the wireless network;

monitoring a status of the wireless network based upon the amalgamated data in real-time;

generating a real-time alert in response to one or more values of the amalgamated data passing a threshold, wherein the real-time alert corresponds to an important event occurring in the wireless network; and automatically updating the source list as instances of the first and second components of the wireless network come online and offline during operation of the wireless network.

12. The automated process of claim 11 wherein the filtering comprises automatically tagging the first and second operating data with information that identifies the related first and second components of the wireless network, respectively.

13. The automated process of claim 11 wherein the filtering comprises deleting at least some components of the first and second operating data.

14. The automated process of claim 11 wherein the providing comprises transmitting the amalgamated operating data in the shared format to a data management system that stores the amalgamated in the common database.

15. The automated process of claim 11 wherein the shared format comprises a Javascript Shared Object Notation (JSON) structure.

16. The automated process of claim 15 wherein the data feed provided by the first data source is a KAFKA data feed.

17. The automated process of claim 11 wherein the important event corresponds to an outage of the wireless network.

18. The automated process of claim 11 wherein at least one of the first components of the wireless network is a distributed unit (DU) of an Open Radio Access Network (ORAN) wireless network implemented within a virtual private cloud (VPC) of a cloud-based data processing system.

19. The automated process of claim 18 wherein the second components of the wireless network maintain the second operating data as log files that are provided in response to the queries.

* * * * *